July 7, 1942.   A. MAS   2,288,820
AIRPLANE POWER PLANT ARRANGEMENT
Filed Dec. 12, 1940   7 Sheets-Sheet 1

INVENTOR
*Antonio Mas*
BY 
ATTORNEY

July 7, 1942.  A. MAS  2,288,820

AIRPLANE POWER PLANT ARRANGEMENT

Filed Dec. 12, 1940  7 Sheets-Sheet 2

INVENTOR
*Antonio Mas*
BY
ATTORNEY

July 7, 1942.  A. MAS  2,288,820
AIRPLANE POWER PLANT ARRANGEMENT
Filed Dec. 12, 1940  7 Sheets-Sheet 5

INVENTOR
Antonio Mas
BY
ATTORNEY

July 7, 1942.  A. MAS  2,288,820
AIRPLANE POWER PLANT ARRANGEMENT
Filed Dec. 12, 1940   7 Sheets—Sheet 7

INVENTOR
*Antonio Mas*
BY
ATTORNEY

Patented July 7, 1942

2,288,820

UNITED STATES PATENT OFFICE 2,288,820

AIRPLANE POWER PLANT ARRANGEMENT

Antonio Mas, New York, N. Y.

Application December 12, 1940, Serial No. 369,761

3 Claims. (Cl. 244—55)

This invention relates to new and useful improvements in speed gearing for prime movers.

More specifically, the invention proposes a gear system or systems to be used in combination with the driven shaft or shafts of a prime mover or movers for stepping up the speed of a propeller or propellers connected with the gear system or systems.

More specifically, the invention contemplates numerous arrangements of step up gear systems which may be used in accordance with this invention.

Still further the invention proposes to so construct the speed gearing that it may be applied to air propellers, marine propellers and other similar devices.

Still further the invention proposes a novel arrangement for supporting the prime movers in a convenient way so that the speed up gearing and the prime movers themselves are readily available for inspection, repairs, etc.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure.

In Figs. 1 to 5 inclusive, one form of the invention has been disclosed in which a prime mover 52 has a driven shaft 51 to which the speed up gearing is associated. More particularly, the prime mover 52 has each end of its shaft 51 provided with a large bevel gear 53 which meshes with a pair of pinions 54 disposed on diametrically opposite sides. These pinions 54 are mounted upon shafts 55 extending to the front and rear and provided with propellers 56.

Each prime mover 52 is mounted on the walls of a casing 57 having an open top 57a and an open bottom 57b. The casing 57 is hingedly supported at one corner by a hinge construction 58. The prime mover 52 is mounted within and upon the walls of the casing 57 by suitable brackets 59.

Figures 1, 6:
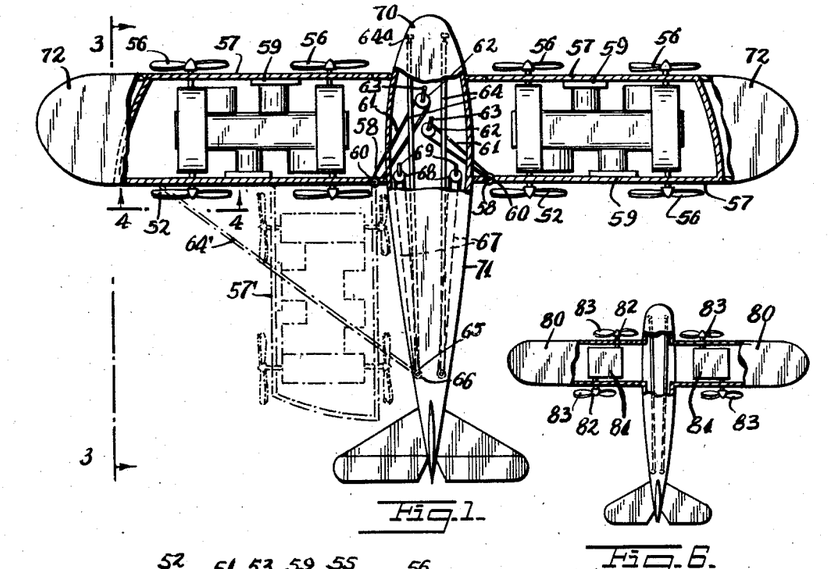
Fig. 1 is a plan view of an airplane provided with prime movers constructed in accordance with this invention, certain parts thereof being broken away to disclose interior parts.
Fig. 6 is a plan view of an airplane provided with a speed up gearing prime mover device constructed according to another form of this invention.
Figures 2, 5A, 7:
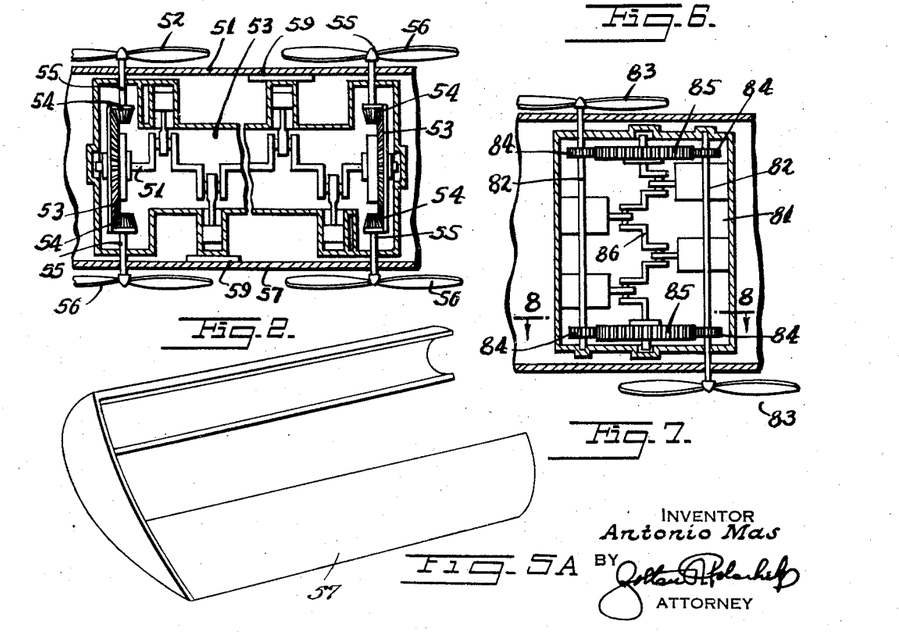
Fig. 2 is a horizontal enlarged sectional view of a portion of Fig. 1 showing particularly some of the details of the prime mover.
Fig. 5A is a perspective view of the wing casing per se.
Fig. 7 is a fragmentary enlarged horizontal sectional view of a portion of Fig. 6 showing particularly some of the details of the prime mover.
Figure 3:
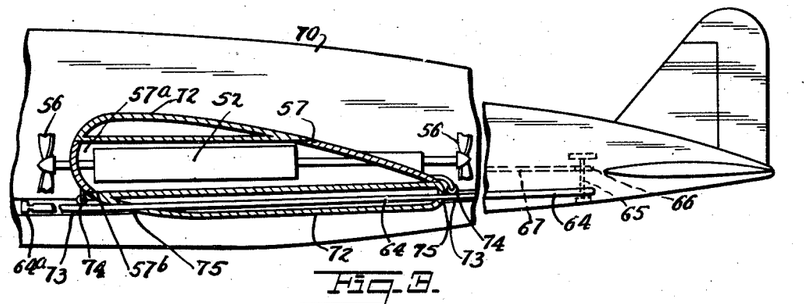
Fig. 3 is a fragmentary enlarged vertical sectional view taken on the line 3—3 of Fig. 1.

Means is provided for moving the casing 57 on its hinge 58. This means includes a gear 60 coaxially mounted with the hinge 58 and connected with the casing 57. This gear 60 is engaged by a chain 61 which engages over a sprocket 62 rotatively supported and provided with a handle 63 by which it may be conveniently turned.

Figure 4:
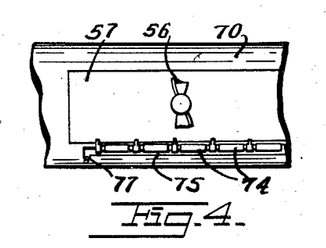
Fig. 4 is a fragmentary enlarged elevational view looking in the direction of the line 4—4 of Fig. 1.

A support arm 64 is provided for each casing 57 and is mounted in the vicinity thereof. Means is provided for moving each support arm 64 beneath the casing 57 along its path of pivoting. This means comprises a pintle pin 65 supporting one end of the arm 64. The pintle pin 65 is provided with a gear 66 engaged by a chain 67 which engages over a gear 68 provided with a handle 69 by which it may be manually turned.

In the particular form of the invention shown in Figs. 1 to 5, the prime mover and speed gearing is shown applied to an airplane 70. This airplane has a fuselage 71 and wings 72. Each wing is formed with an opening extended inwards from its front and rear edges, as clearly shown in Fig. 3. The casing 57 is disposed within this opening. The prime mover, as previously explained, is disposed within the casing 57. The parts are so arranged that the propellers 56 are arranged to the front and to the rear of the front and rear edges of the wings. In Fig. 1 the full lines illustrate the normal position of the various parts. However, when it is desired to reach the prime movers, or the speed gearing for repairs, etc., it is possible to swing the entire casing 57 from its full line position to the dot and dash line position which is indicated by the reference numeral 57'.

Figure 5:
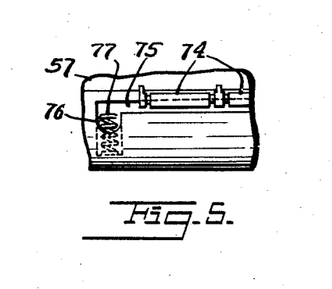
Fig. 5 is an enlarged detailed view of a portion of Fig. 4.

Normally, the support arms 64 are disposed within grooves 73 formed in the sides of the fuselage 71. Before the casing 57 is swung outwards it is necessary that the support arm 64 be extended outwards to a position indicated by the dot and dash lines 64'. Each of the casings 57 is provided with a plurality of rollers 74 mounted along its bottom edges, which rollers are adapted to rest upon the support arm 64 during the pivoting of the casing. Each support arm 64 is provided with an enlarged head 64a on its free end. Each support arm 64 swings in a slot 75 formed in the wing 72, beneath the wing opening in which the casing 57 is set. The outer end of each slot 75 has an enlarged portion 76 behind which an expansion spring 77 is mounted. The arrangement is such that when the support arm 64 swings to its outermost position, indicated by the dot and dash lines 64' in Fig. 1, the head 64a will rest on the spring 77. However, the head 64a is much larger than the enlarged opening 76 so that it cannot move out.

When the casing 57 is hinged to its open position the rollers 74 will run along the support arm 64 depressing the head end 64a slightly so that it extends downwards into the enlarged portion 76, which locks the arm 64 against accidental swinging inwards. The arm 64 is thus locked during the entire period that the casing 57 and its attached prime mover is in an open position. The pintle 65 has a slight tolerance which permits the headed end 64a of the support arm 64 to engage the enlarged portion 76 of the slot 75.

With the casing 57 in the open position 57', the prime mover and speed gearing is accessible for repair or replacement. The parts may be returned to normal by first operating the handle 63 which returns the casing 57 to its original position. After the casing 57 reaches its original position the rollers 74 ride off the support arm 64 so that the spring 77 lifts the outer end of the support arm 64. Then the handle 69 may be operated to indirectly cause the support arm 64 to assume its inoperative position within the groove 73.

Figure 8:
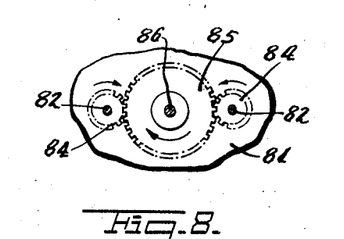
Fig. 8 is a fragmentary vertical sectional view taken on the line 8—8 of Fig. 7.

In Figs. 6 to 8 inclusive, another form of the invention has been disclosed. It is shown applied to an airplane 80. Each wing is provided with a prime mover 81 having driven shafts 82 extended from opposite corners. These driven shafts are provided with propellers 83.

More specifically, the prime mover 81 has the shafts 82 arranged parallel to each other along the sides thereof. Each shaft 82 is provided with a pair of spaced gears 84 which mesh with large gears 85 mounted on the main shaft 86 of the prime mover.

Figure 9:
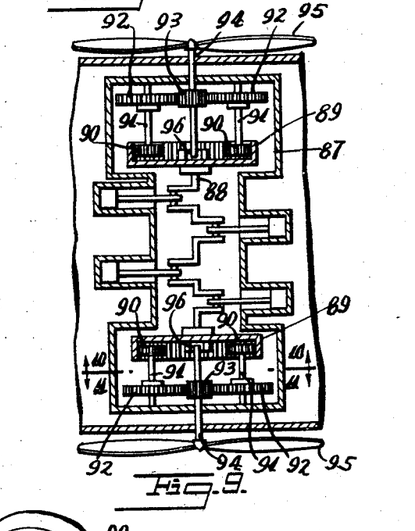
Fig. 9 is a horizontal sectional view of a prime mover with a speed step up gearing system constructed in accordance with another form of this invention.
Figure 10:
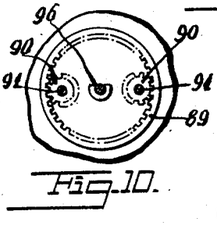
Fig. 10 is a sectional view on the line 10—10 of Fig. 9.
Figure 11:
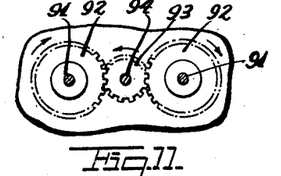
Fig. 11 is a sectional view taken on the line 11—11 of Fig. 9.

In Figs. 9 to 11 another modified arrangement of speed gearing is shown in which the prime mover 87 is provided with a main shaft 88 having internal gears 89 mounted on its ends.

These internal gears 89 are each engaged by a pair of gears 90 mounted on parallel shafts 91 which are rotatively supported. The shafts 91 are provided with gears 92 meshing with a pinion 93 on a propeller shaft 94 provided with a propeller 95. The propeller shaft 94 has a bearing 96 mounted coaxially on the internal gear 89.

Figure 12:
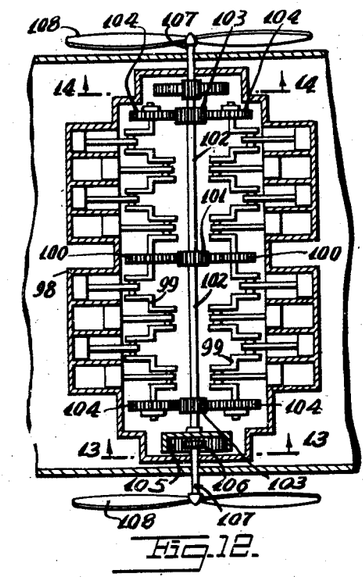
Fig. 12 is another horizontal sectional view of a prime mover with a speed gearing system according to another form of this invention.
Figure 13:
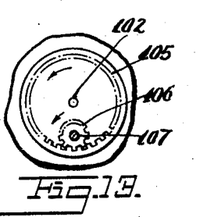
Fig. 13 is a fragmentary sectional view taken on the line 13—13 of Fig. 12.
Figure 14:
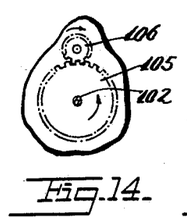
Fig. 14 is a fragmentary sectional view on the line 14—14 of Fig. 12.

In Figs. 12 and 13 a prime mover 98 is illustrated with a pair of main shafts 99 provided with gears 100 meshing with a pinion 101 on a propeller shaft 102 which extends completely through the prime mover. This propeller shaft 102 is provided with a gear 103 on each end meshing with gears 104 on the propeller shafts 99. The ends of the shaft 102 are provided with internal gears 105 which mesh with pinions 106 upon propeller shafts 107 provided with propellers 108.

Figure 15:
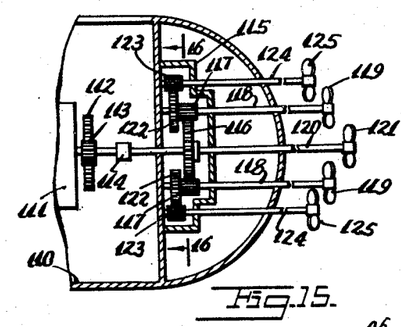
Fig. 15 is a fragmentary horizontal sectional view of another speed gearing system constructed according to another form of this invention.
Figure 16:
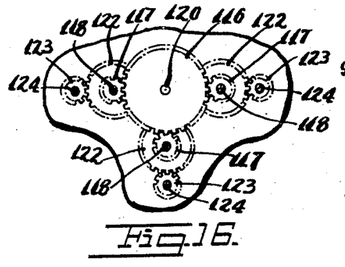
Fig. 16 is a fragmentary sectional view on the line 16—16 of Fig. 15.

In Figs. 15 and 16 another embodiment of the invention is disclosed in which a vessel 110 is provided with a prime mover 111 having a gear 112 meshing with a pinion 113 on a drive shaft 114. This drive shaft extends into a gearing housing 115. It is provided with a gear 116 meshing with pinions 117 on shafts 118 provided with propellers 119. The gear 118 is provided with a shaft 120 having a propeller 121. The shafts 118 are provided with gears 122 meshing with pinions 123 on shafts 124 provided with propellers 125. Preferably, the various propellers comprise marine propellers for driving the vessel 110.

Figures 17, 18, 19, 20, 21, 22, 23, 24:
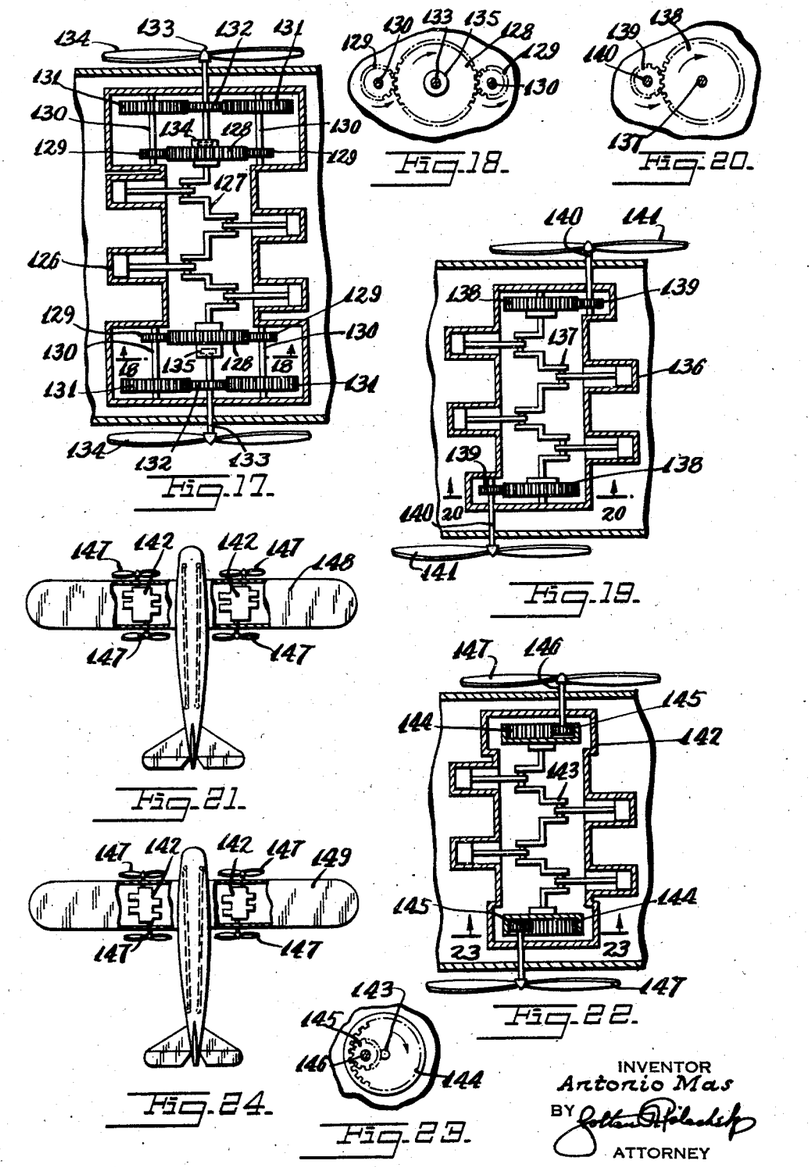
Fig. 17 is another fragmentary horizontal sectional view of a prime mover with a speed gearing system embodying another form of this invention.
Fig. 18 is a fragmentary sectional view taken on the line 18—18 of Fig. 17.
Fig. 19 is another fragmentary horizontal sectional view of a prime mover with speed gearing constructed according to this invention.
Fig. 20 is a fragmentary sectional view on the line 20—20 of Fig. 19.
Fig. 21 is a plan view of an airplane with prime movers and speed gearing according to still another form of this invention, portions of this figure being broken to disclose interior parts.
Fig. 22 is a horizontal sectional enlarged view of a portion of Fig. 21 showing details of the prime mover and speed gearing.
Fig. 23 is a fragmentary sectional view taken on the line 23—23 of Fig. 22.
Fig. 24 is a plan view of an airplane provided with prime movers and speed gearing in accordance with still another form of this invention, a portion of this view being broken away to disclose interior parts.

In Figs. 17 and 18 a prime mover 126 is provided with a main shaft 127 having gears 128 meshing with pinions 129 upon groups of parallel shafts 130. These shafts 130 are provided with gears 131 meshing with pinions 132 on shafts 133 provided with propellers 134. The shafts 133 have bearings 135 mounted coaxially of the gears 128.

In Figs. 19 and 20 a prime mover 136 is illustrated with a main shaft 137 provided at its ends with gears 138 which mesh with pinions 139 on auxiliary shafts 140 provided with propellers 141.

In Figs. 21 to 23 a prime mover 142 is provided with a main shaft 143 having internal gears 144 upon its ends. These internal gears mesh with pinions 145 on rotatively supported shafts 146 provided with propellers 147. In Fig. 21 an airplane 148 is illustrated provided with the prime movers and propellers shown in Figs. 22 and 23.

In Fig. 24 an airplane 149 of a slightly different design than the airplane 148 is shown provided with similar prime movers and propellers as that shown in Fig. 21.

Figure 25:
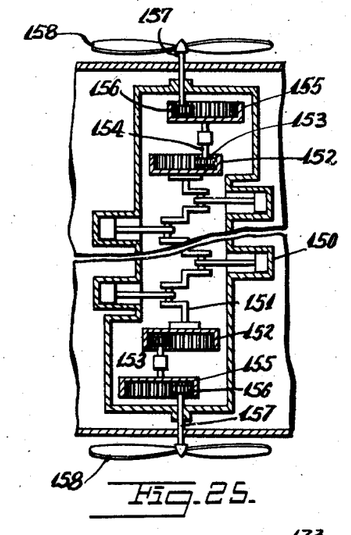
Fig. 25 is a fragmentary horizontal sectional view of a prime mover with speed gearing constructed according to another form of this invention.

In Fig. 25 a prime mover 150 is shown with a main shaft 151 having internal gears 152 mounted upon its ends. These gears 152 mesh with pinions 153 on rotatively supported shafts 154 provided with internal gears 155 meshing with pinions 156 on rotatively supported shafts 157 provided with propellers 158.

Figure 26:
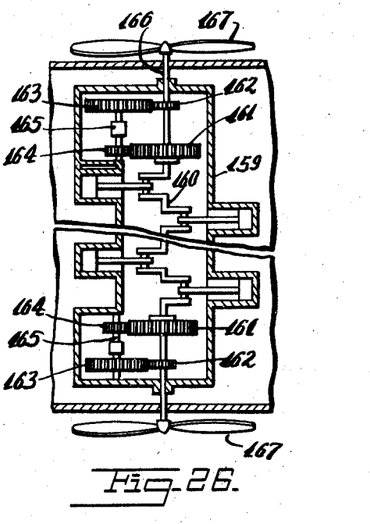
Fig. 26 is a horizontal sectional view of another prime mover with speed gearing according to another form of this invention.

Fig. 26 shows a prime mover 159 with a main shaft 160 provided with a pair of gears 161 and 162 meshing with gears 163 and 164 on a rotatively supported shaft 165. The gears 162 and 161 are mounted on a rotative shaft 166 provided with a propeller 167.

Figure 27:
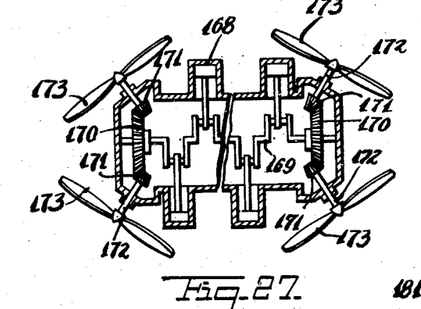
Fig. 27 is a horizontal sectional view of still another prime mover with speed gearing arranged in accordance with another form of this invention.

In Fig. 27 a prime mover 168 is shown provided with a shaft 169 having bevel gears 170 on its ends meshing with pinions 171 on rotatively mounted shafts 172 provided with propellers 173.

Figure 28:
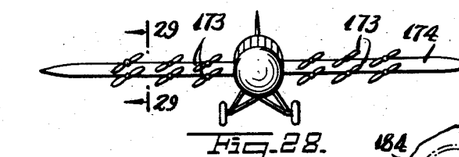
Fig. 28 is a front elevational view of an airplane with prime movers embodying this invention.
Figure 29:
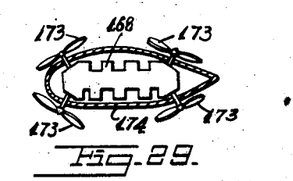
Fig. 29 is a fragmentary horizontal sectional view on the line 29—29 of Fig. 28.

In Figs. 28 and 29 an airplane 174 is shown provided with the prime movers 168, the gear system and the propellers 163.

Figure 30:
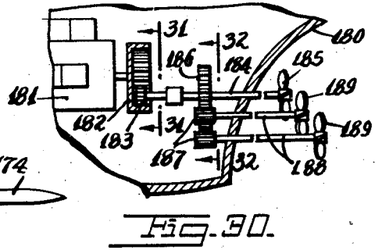
Fig. 30 is a fragmentary sectional view of a vessel with a prime mover and speed gearing in accordance with another form of this invention.
Figure 31:
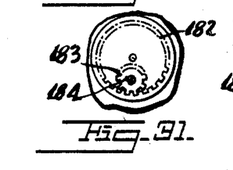
Fig. 31 is a fragmentary sectional view taken on the line 31—31 of Fig. 30.
Figure 32:
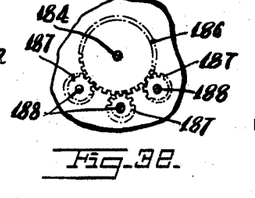
Fig. 32 is a fragmentary sectional view taken on the line 32—32 of Fig. 20.

In Figs. 30 to 32 a vessel 180 is shown provided with a prime mover 181 having a shaft with an internal gear 182 meshing with a pinion 183 on a rotative shaft 184 provided with a propeller 185. This shaft 184 is provided with a large gear 186. Several small gears 187 mesh with this large gear and are located on shafts 188 provided with propellers 189.

Figures 33, 34, 35, 36, 37, 38, 39, 40, 41, 43:
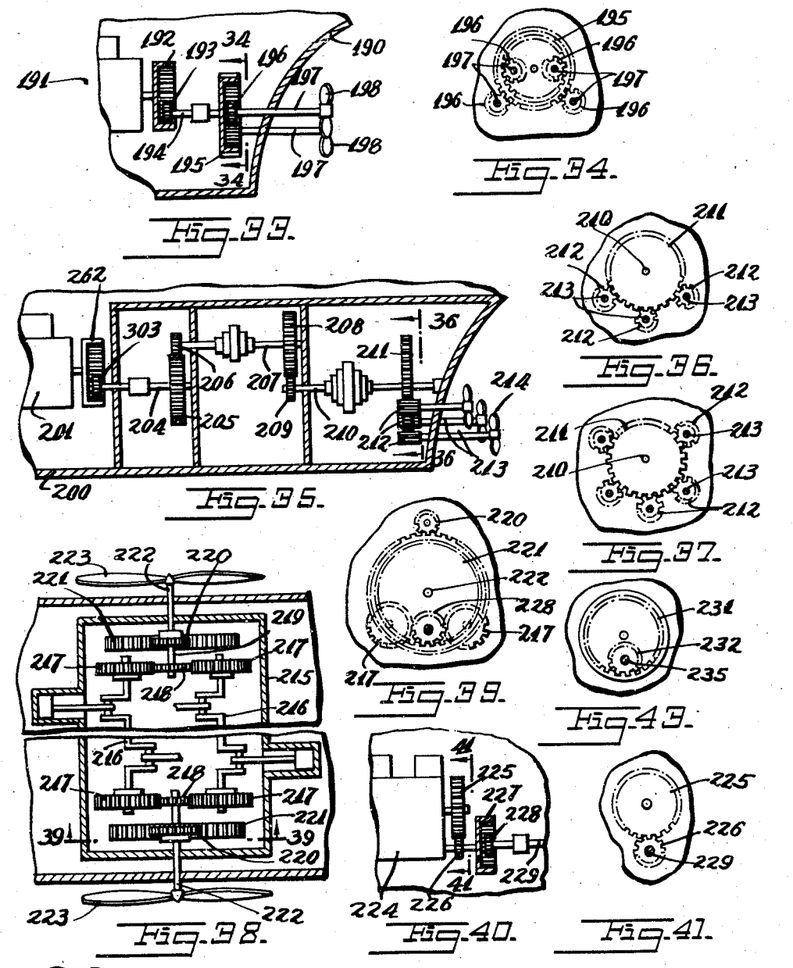
Fig. 33 is a fragmentary vertical sectional view of a vessel with a prime mover and speed gearing in accordance with another form of this invention.
Fig. 34 is a fragmentary sectional view taken on the line 34—34 of Fig. 33.
Fig. 35 is a fragmentary vertical sectional view of a vessel with a prime mover and speed gearing arranged in accordance with another form of the invention.
Fig. 36 is a fragmentary sectional view on the line 36—36 of Fig. 35.
Fig. 37 is a sectional view similar to Fig. 36 but illustrating another arrangement.
Fig. 38 is a horizontal sectional view of another prime mover and speed gearing arranged in accordance with still another form of this invention.
Fig. 39 is a fragmentary sectional view taken on the line 39—39 of Fig. 38.
Fig. 40 is a fragmentary elevational view of a prime mover and speed gearing arranged in accordance with still another form of this invention.
Fig. 41 is a sectional view on the line 41—41 of Fig. 40.
Fig. 43 is a sectional view taken on the line 43—43 of Fig. 42.

In Figs. 33 and 34 a vessel 190 is illustrated with a prime mover 191 having an internal gear 192 meshing with a pinion 193 on a rotative shaft 194 carrying a combination internal and external gear 195. Pinions 196 mesh with this combination gear and are mounted on shafts 197 provided with propellers 198.

In Figs. 35 and 36 a vessel 200 is illustrated with a prime mover 201 having an internal gear 202 meshing with a pinion 203 on a shaft 204 provided with a gear 205 meshing with a pinion 206 on a rotative shaft 207 provided with a gearing 208 meshing with a pinion 209 upon a shaft 210 rotatively supported and provided with a gear 211. A plurality of small gears 212 mesh with the gear 211 and are on shafts 213 rotatively supported and provided with propellers 214.

In Fig. 37 a modified arrangement is shown in which the gear 211 meshes with a plurality of pinions 212 on shafts 213 arranged at different locations to the corresponding shafts of Fig. 36.

In Figs. 38 and 39 a prime mover 215 is shown with parallel main shafts 216 provided with gears 217 meshing with a pinion 218 on a shaft 219 provided with a gear 220 meshing with a gear 221 on a shaft 222 provided with a propeller 223.

In Figs. 40 and 41 a prime mover 224 is provided with a gear 225 meshing with a pinion 226 on a shaft provided with an internal gear 227 meshing with a pinion 228 on a propeller shaft 229.

Figure 42:
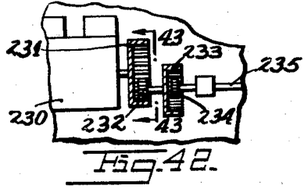
Fig. 42 is a fragmentary elevational view of a a prime mover and speed gearing arranged according to another form of this invention.

In Figs. 42 and 43 a prime mover 230 is provided with an internal gear 231 meshing with a gear 232 on a rotative shaft provided with an internal gear 233 corresponding with a pinion 234 on a rotative shaft 23 of a propeller.

Figures 44, 45:
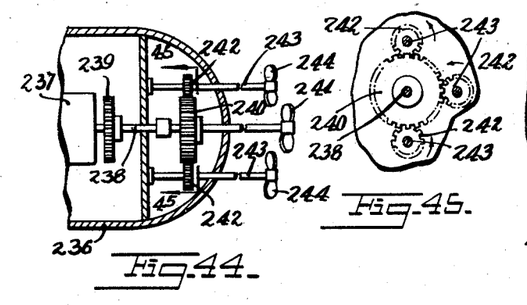
Fig. 44 is a fragmentary horizontal sectional view of a vessel with a prime mover and speed gearing arranged according to another form of this invention.
Fig. 45 is a fragmentary sectional view taken on the line 45—45 of Fig. 44.

In Figs. 44 and 45 a vessel 236 is shown with a prime mover 237 provided with a shaft 238 having a flywheel 239. The shaft 238 is rotatively supported and provided with a latch gear 240. The shaft 238 has a propeller 241. Pinions 242 mesh with the gear 240 and are on rotative shafts 243 provided with propellers 244.

Figure 46:
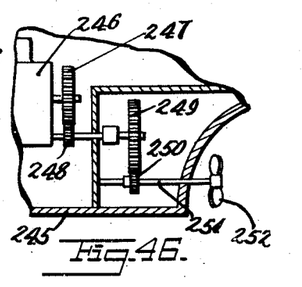
Fig. 46 is a fragmentary vertical sectional view of another vessel with a prime mover and speed gearing arranged in accordance with another form of this invention.

In Fig. 46 a vessel 245 is provided with a prime mover 246 having a gear 247 meshing with a pinion 248 on a rotative shaft provided with a gear 249 meshing with a pinion 250 on a propeller shaft 251 having a propeller 252.

Figure 47:
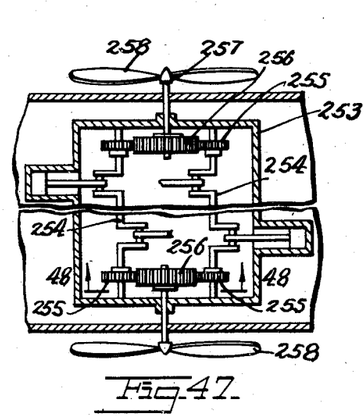
Fig. 47 is a horizontal sectional view of a prime mover and speed gearing arranged in accordance with still another form of this invention.
Figure 48:
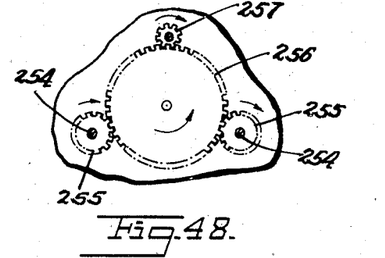
Fig. 48 is a fragmentary sectional view on the line 48—48 of Fig. 47.

In Figs. 47 and 48 a prime mover 253 is provided with a pair of parallel shafts 254 having gears 255 meshing with gears 256 on rotative shafts 257 provided with propellers 258.

Figure 49:
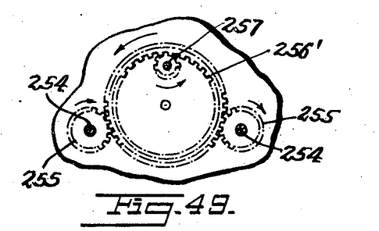
Fig. 49 is a sectional view similar to Fig. 48 but illustrating a modified arrangement.

In Fig. 49 a modified arrangement is shown in which the gear 256 has internal and external teeth and the propeller shaft 257 meshes with the internal teeth while the gears 255 mesh with the external teeth.

Figure 50:
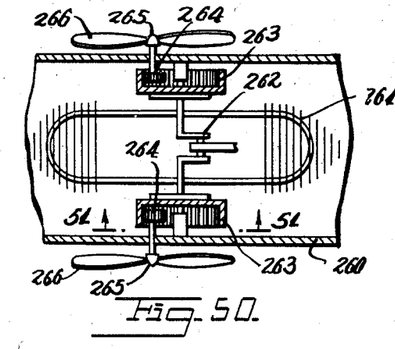
Fig. 50 is a horizontal sectional view of a prime mover and speed gearing arranged in accordance with still another form of this invention.
Figure 51:
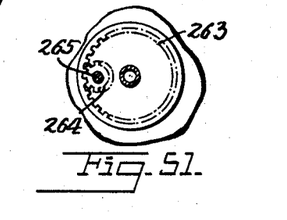
Fig. 51 is a sectional view on the line 51—51 of Fig. 50.

In Figs. 50 and 51 a vessel 260 is shown provided with a prime mover 261 having a shaft 262 provided with internal gears 263 meshing with gears 264 on propeller shafts 265 rotatively supported and provided with propellers 266.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a device of the class described, a casing having an open top and hingedly supported at one corner, a prime mover mounted within and upon the walls of said casing, means for moving said casing on its hinge, a support arm movably mounted in the vicinity of said casing, and means for moving said support arm beneath said casing along the path of its pivoting.

2. In a device of the class described, a casing having an open top and hingedly supported at one corner, a prime mover mounted within and upon the walls of said casing, means for moving said casing on its hinge, a support arm movably mounted in the vicinity of said casing, means for moving said support arm beneath said casing along the path of its pivoting, and means for locking said support arm in an extended position.

3. In an airplane having a wing with an opening extending from its leading edge to its back edge, a casing mounted within said opening for closing the same and having an open top and bottom with a prime mover mounted between the walls thereof, means for pivotally supporting said casing at one corner to be swingable rearwards out of said wing to expose said prime mover through its open top and bottom, a retractable support arm extending along the path of pivoting of said casing for supporting the free end thereof when swinging outwards, a sprocket wheel attached to said casing and arranged concentric with the pivot point of said casing, a manually rotative sprocket wheel mounted within said airplane, and a chain engaged over said sprocket wheels, whereby said manually rotative sprocket wheel may be turned to similarly rotate said first sprocket wheel to pivot said casing out of said wing.

ANTONIO MAS.